United States Patent
Li et al.

(10) Patent No.: US 10,917,790 B2
(45) Date of Patent: Feb. 9, 2021

(54) SERVER TRUST EVALUATION BASED AUTHENTICATION

(71) Applicant: Apple Inc., Cupertino, CA (US)

(72) Inventors: Li Li, Los Altos, CA (US); Arun G. Mathias, Los Altos, CA (US); Gokul P. Thirumalai, Mountain View, CA (US); Najeeb M. Abdulrahiman, Fremont, CA (US); Francisco J. Gonzalez, San Diego, CA (US); Jonathon Sodos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 15/996,324

(22) Filed: Jun. 1, 2018

(65) Prior Publication Data

US 2019/0373471 A1     Dec. 5, 2019

(51) Int. Cl.
| | |
|---|---|
| *H04W 12/08* | (2009.01) |
| *H04L 9/32* | (2006.01) |
| *H04W 12/12* | (2021.01) |
| *H04L 29/06* | (2006.01) |
| *H04W 12/06* | (2021.01) |

(52) U.S. Cl.
CPC ........... *H04W 12/08* (2013.01); *H04L 9/3234* (2013.01); *H04L 9/3247* (2013.01); *H04L 63/0853* (2013.01); *H04L 63/0884* (2013.01); *H04W 12/06* (2013.01); *H04W 12/0804* (2019.01); *H04W 12/12* (2013.01)

(58) Field of Classification Search
CPC ......... H04W 12/0403; H04W 12/0407; H04W 12/06; H04W 12/0804; H04L 9/3234; H04L 63/0884

See application file for complete search history.

(56) References Cited

U.S. PATENT DOCUMENTS

| | | | | |
|---|---|---|---|---|
| 7,280,830 | B2 * | 10/2007 | Anderson | H04L 12/2854 |
| | | | | 455/410 |
| 9,401,905 | B1 * | 7/2016 | Kowalski | H04L 63/0853 |
| 2005/0277412 | A1 | 12/2005 | Anderson et al. | |
| 2012/0272232 | A1 * | 10/2012 | Song | G06F 8/61 |
| | | | | 717/178 |

(Continued)

OTHER PUBLICATIONS

Indian Patent Application No. 201914021615—First Examination Report dated Oct. 31, 2020.

*Primary Examiner* — Daniel B Potratz

(74) *Attorney, Agent, or Firm* — Dickinson Wright RLLP

(57) ABSTRACT

Disclosed herein are techniques for enabling a user to activate a new device with a Mobile Network Operator (MNO) without requiring the user to provide MNO authentication credentials that are easily forgotten. The user activates the new device using credentials from an existing device (associated with the user) that is trusted by the MNO and also using a trust score provided by a third-party server that has knowledge of associations between the user and the existing device. The new device can be a supplemental device, such as a wearable device to a cellular phone, where both devices remain capable of accessing services provided by the MNO after the new device is activated with the MNO. The new device can also be a replacement device, such as a new phone, tablet, or wearable device, where the new device supplants access to services provided by the MNO for an existing device.

20 Claims, 7 Drawing Sheets

(56) References Cited

U.S. PATENT DOCUMENTS

| | | | |
|---|---|---|---|
| 2013/0318343 A1* | 11/2013 | Bjarnason | H04L 63/08 |
| | | | 713/157 |
| 2014/0357229 A1* | 12/2014 | Lee | H04W 8/245 |
| | | | 455/411 |
| 2016/0150400 A1* | 5/2016 | Cha | G06F 1/1637 |
| | | | 455/418 |
| 2018/0191728 A1* | 7/2018 | Kim | H04L 63/126 |
| 2019/0174299 A1* | 6/2019 | Ullah | H04L 63/0876 |

\* cited by examiner

SERVER TRUST EVALUATION BASED AUTHENTICATION

FIELD

The described embodiments relate to authenticating a subscriber identity module for use in a wireless device, including using a server trust evaluation during an authentication flow to obviate requirements for a carrier user login.

BACKGROUND

A user device can be provisioned with a subscriber identity module (SIM) or an electronic subscriber identity module (eSIM). For security protection, a carrier user login is often required for sensitive transactions, such as adding cellular service. User login via a carrier server poses a challenge for users, because users often forget usernames and/or passwords. As a result, users may cancel their transactions.

Aspects of SIM/eSIM provisioning include the downloading, installing, enabling, disabling, switching, deleting, and updating of a SIM/eSIM (also referred to as a profile) on a universal integrated circuit card (UICC) or embedded UICC (eUICC). UICCs and eUICCs are secure elements (SEs) for hosting profiles. A profile is a combination of operator data and applications provisioned on an SE in a device for the purposes of providing services by an operator. A profile can contain secure data used to prove identity and thus verify contract rights to services. During assembly of a device, a SE can be installed into the device. An eUICC may be identified by an eUICC identifier, such as an equipment identifier (EID). The techniques and apparatuses described herein are applicable for an eUICC as well as for a UICC.

A profile can be identified by a unique number referred to as an ICCID (Integrated Circuit Card Identifier) for a SIM and as an embedded ICCID (eICCID) for an eSIM. A mobile network operator (MNO) is an entity providing access capability and communication services to its subscribers through a mobile network infrastructure. In some cases, the device is a user equipment (UE) used in conjunction with a UICC to connect to a wireless network. An end user or customer is a person using the device.

SIM/eSIM authentication can be based on credentials that are shared between a SIM card or eSIM and a home location register (HLR)/home subscriber server (HSS) of a cellular wireless network. Physical possession of a SIM or eSIM at a device, however, does not prove rightful ownership by a user of the device.

A vulnerability of relying on physical possession of a SIM/eSIM to indicate rightful ownership is that an attacker can steal a SIM card for a short duration from a user's device, insert the SIM card into the attacker's device, and sign up for cellular service on the user's account via the attacker's device. The SIM card can be returned to the user's device without the user's notice. Mandating login credentials for a user account maintained by an MNO to establish access to cellular service provided by the MNO can prevent such an attack; however, requiring such MNO authentication credentials contributes to a sub-optimal user experience in cases where an attack did not transpire.

SUMMARY

Representative embodiments set forth herein disclose various systems and techniques for password-less secure authentication for subscriber identity modules (SIMs) and electronic SIMs (eSIMs).

Traditional authentication of subscriber identity modules (SIMs) for access to cellular wireless services has focused on using credentials supplied by a SIM installed in a wireless device. This technique is susceptible to misuse, such as by people who borrow a SIM from a device, perhaps without the knowledge or consent of the SIM's owner. For certain sensitive transactions, such as adding and/or modifying cellular service, one way to increase security is to require a user to log in to a carrier server using previously established user login credentials. These user login credentials may include a password that is rarely used and easily forgotten by the owner of the user login credentials. Certain embodiments described herein permit skipping a user login authentication procedure when authentication can be performed using an alternative criterion or set of criteria. A system can take into account a history of a user, the user's devices, and associated user accounts to determine whether a user login is necessary to allow certain transactions. Both SIM and electronic SIM (eSIM) embodiments can adopt these principles.

Certain embodiments may be used to establish cellular service for a new device, such as adding the new device to an existing cellular service account, and other embodiments may be used to transfer a cellular service account from one device (e.g., an existing device) to a new device, such as between a previous secondary device associated with a primary device and a new secondary device to be associated with the primary device. In the case of establishing cellular service for a new device, a current device may initiate authentication with an entitlement server maintained by a wireless service provider. Responsive to a communication that includes a nonce from the entitlement server, the current device may request an authentication token from a remote server maintained by a third party with which a user may already have an account and/or an established history. The request for the authentication token can include unique identifiers associated with the current device, such as an international mobile subscriber identity (IMSI), a phone number, an international mobile equipment identifier (IMEI), a mobile equipment identifier (MEID), and the nonce previously received from the entitlement server.

The remote server can perform a security validation of the user and calculate a trust score for the user based on the information provided by the current device in the request. The remote server may take into account information about the user that can be accessed, such as a history of association of the user with all or parts of the information provided in the request. The remote server can use the received information to query further servers in order to obtain further information. Based on the information available, however it was obtained, the remote server can generate a trust score for the user and can reply to the current device with a signed message that includes the generated trust score. The message can also include copies of the information provided in the request, such as the phone number, IMEI, MEID, and nonce.

The current device can send a pre-flight request (query) for security validation to the entitlement server, the pre-flight request including the information provided by the remote server including the generated trust score. The pre-flight request can also include the nonce signed by the eUICC of the current device. In response to the pre-flight request, the entitlement server can perform a security validation and return a result, together with a carrier token. The result of the pre-flight query may be used to drive a user interface (UI) of the current device; for example, when the pre-flight check succeeds, which can be indicated in the result, the current device can provide an alternative native one-click UI for establishing service for the new device rather than opening a web sheet to access a portal of a wireless service provider.

The current device can sign up for cellular wireless service for a new device, such as for a new secondary device to be associated with the current device, which can serve as a primary device for the new secondary device, by launching a web sheet to access a web sheet server maintained by the wireless service provider of the cellular wireless service sought for the new device. When launching the web sheet, the current device can provide the carrier token obtained from the entitlement server. The web sheet server can query the entitlement server to determine a trust score and to determine whether additional credentials, such as login credentials for a user account maintained by a wireless service provider, are necessary to establish the requested cellular wireless service for the new device. The web sheet server can respond back to the current device requesting service, and on the basis of the response from the web sheet server establish the requested cellular wireless service for the new device. In some embodiments, the requested cellular wireless service adds the new device to an existing wireless service account. In some embodiments, the new device is a secondary device associated with the current device via a common user account. In some embodiments, access to cellular wireless services for the new device can be achieved by installation of an eSIM on the new device.

In the case of an account transfer, a similar process can be used to the sign-up process including authenticating with an entitlement server of a wireless service provider based on use of a trust score for a user obtained from a third-party server in place of a carrier service provider login process. When the trust score allows for skipping the login process, the current device can prompt the user to initiate transfer of a previously established wireless service account from one device to another device. The current device can send a swap account request to the entitlement server, where the swap account request includes unique credentials for both the previous device and the new device. For example, the account transfer can be between two secondary devices associated with a current device, which can be referred to as a primary device. The primary device can retain access to cellular wireless services associated with a wireless service account, while a new secondary device can replace a previous secondary device for access to the wireless services associated with the wireless service account. Each device can have unique hardware-based and software-based credentials such as equipment identifiers (EIDs), integrated circuit card identifiers (ICCIDs), and/or embedded ICCIDs (eICCIDs). The entitlement server can respond to an account swap request by providing new credentials, such as a new eICCID, by assigning a new eSIM to the new device by providing a download order instruction (DownloadOrder) and a confirm order instruction (ConfirmOrder) to a subscription management network-based server, e.g., a wireless service carrier SM-DP+. In addition, the entitlement server can submit a request to the subscription management network-based server, e.g., to the SM-DP+, to cause an account swap. In some embodiments, optionally, the old eSIM of the previous device can be deleted or otherwise rendered inactive, such as by remote profile management. In some embodiments, a previous eICCID associated with a previous eSIM of the previous secondary device is replaced with a new eICCID associated with the new eSIM of the new secondary device in the wireless service provider's backend network. In some embodiments, access to cellular wireless services for the secondary device is achieved by installation of an eSIM on the new secondary device via the subscription management network-based server and/or by activation of a previously installed eSIM on the new secondary device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for password-less secure authentication. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

DETAILED DESCRIPTION

Figure 1:
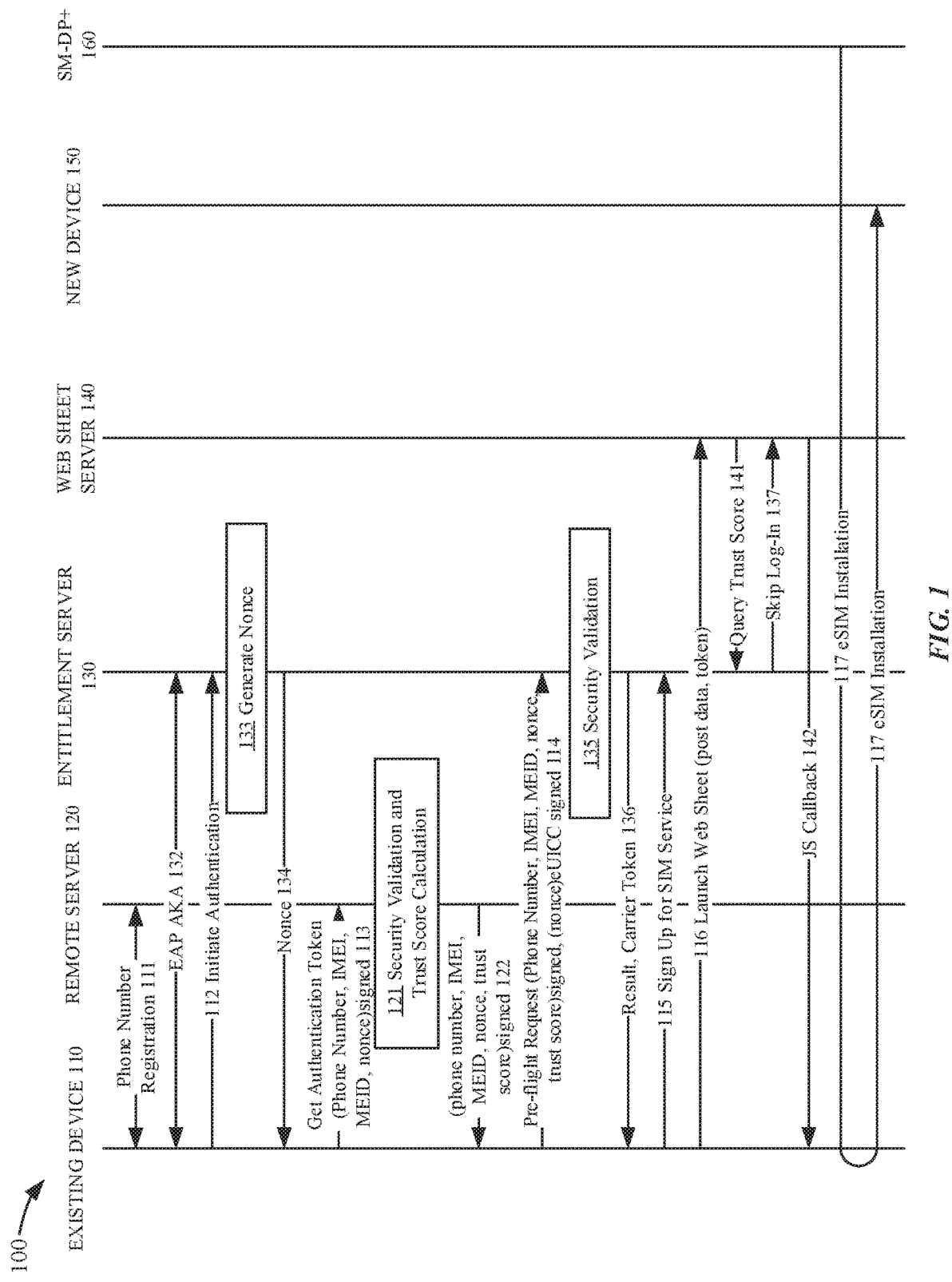
FIG. 1 illustrates an exemplary detailed message flow for secure password-less authentication, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth a technique for enabling a user to activate a new mobile device with a Mobile Network Operator (MNO) without requiring the user to provide MNO authentication credentials that are infrequently utilized/easily forgotten. According to some embodiments, the technique can enable the user to activate the new mobile device using an existing mobile device (associated with the user) that is trusted by (1) the MNO, as well as (2) a managing entity that manages the existing mobile device (e.g., a manufacturer of the existing mobile device). In some embodiments, the new mobile device can function as a supplemental mobile device to the existing mobile device, such that both the existing mobile device and the new mobile device remain capable of accessing services provided by the MNO after the new mobile device is activated with the MNO (e.g., a wearable/tablet mobile device+a smartphone mobile device). In other embodiments, the new mobile device can function as a replacement mobile device for an existing mobile device, such that the existing mobile device is no longer capable of accessing services provided by the MNO after the new mobile device is activated by the MNO (e.g., a smartphone/replacement smartphone). In some embodiments, the new mobile device is a new secondary device that replaces a previous secondary device, where each of the new and mobile secondary are associated with the existing mobile device, which acts as a primary device. (e.g., a wearable device/replacement wearable device associated with a smartphone).

To implement the foregoing technique, an existing (current) mobile device can be configured to authenticate with the MNO using MNO-credentials that are possessed by the existing mobile device—e.g., MNO-credentials derived from (1) an electronic Subscriber Identity Module (eSIM) stored on the existing mobile device, or (2) a physical SIM card installed within the existing mobile device. In turn, when the MNO authenticates the existing mobile device, the MNO can return a nonce that is utilized throughout the technique to help thwart potential man-in-the-middle attacks. Next, the existing mobile device can provide, to a managing entity (that manages the existing mobile device), a request to generate a trust score for the existing mobile device. According to some embodiments, the request can include (1) the nonce, and (2) information associated with the existing mobile device (e.g., a phone number associated with the existing mobile device, an IMEI/MED associated with the existing mobile device, and so on). Notably, the existing mobile device can utilize a private key (that is specific to the existing mobile device) to establish a digital signature for the request, where the managing entity possesses a public key that is counterpart to the private key and that can be used to verify the signature. In any case, and according to some embodiments, the managing entity can generate the trust score based on various factors, including (1) a duration of a relationship that exists between the user and a phone number associated with the existing mobile device, (2) a duration of an association between the existing mobile device and the phone number associated with the existing mobile device, (3) a verification that the existing mobile device has not been modified outside of a configuration that is enforced by the managing entity (e.g., the existing mobile device has not been subject to jailbreaking), (4) a verification that the user and/or the second mobile device are not associated with fraudulent activity, and so on.

Subsequent to generating the trust score, the managing entity can generate a response that includes (1) the trust score for the existing mobile device (based on the various factors described above), and (2) a digital signature for the response that is established using a private key associated with the managing entity. Additionally, the managing entity can provide, to the MNO, the public key counterpart to the private key associated with the managing entity, thereby enabling the MNO to verify subsequent requests submitted by the existing mobile device to the MNO. When the managing entity returns the response (i.e., the trust score) to the existing mobile device, the existing mobile device can determine whether the trust score satisfies a threshold. In particular, when the trust score satisfies the threshold, the existing mobile device can be configured to submit, to the MNO, a request for an authentication token that provides access to SIM data. According to some embodiments, the request can include (1) the nonce, and (2) the trust score, such that the MNO can identify that the user of the existing mobile device can be trusted (despite not providing specific MNO authentication credentials, such as login credentials). Additionally, the request can include a digital signature that is established using the private key associated with the managing entity, where the MNO can verify the digital signature by utilizing the public key counterpart (provided to the MNO by the managing entity (as described above)).

According to some embodiments, when the MNO verifies that the digital signature is valid and that the trust score is satisfactory, the MNO can provide the authentication token to the existing mobile device. According to some embodiments, the MNO can also provide, to one or more SIM data servers, information associated with the authentication token. In this manner, the existing mobile device can forward the authentication token to the new mobile device to enable the new mobile device to obtain SIM data that will enable the new mobile device to access services provided by the MNO. In turn, the new mobile device can submit a request for SIM data to the one or more SIM data servers, where the request includes the authentication token. In response, the one or more SIM data servers can utilize the information (that is associated with the authentication token and was provided by the MNO to the one or more SIM data servers) to verify the authentication token. Finally, the one or more SIM data servers can select existing SIM data—or generate new SIM data—and provide the SIM data to the new mobile device to enable the new mobile device to access services provided by the MNO.

Variety of Radio Access Technologies

Wireless devices, and mobile devices in particular, can incorporate multiple different radio access technologies (RATs) to provide connections through different wireless networks that offer different services and/or capabilities. A wireless device can include hardware and software to support a wireless personal area network (WPAN) according to a WPAN communication protocol, such as those standardized by the Bluetooth® special interest group (SIG) and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network (WLAN) and/or to a wireless wide area network (WWAN) to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) long term evolution (LTE), LTE Advanced (LTE-A), and/or fifth generation (5G) or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an ad hoc wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

Embodiments disclosed herein may be implemented in a variety of ways, of which the following methods, servers, and devices involved are examples. Before describing the methods, servers, and devices involved with this solution, eSIM provisioning will be described briefly to aid in the subsequent discussion.

eSIM Provisioning

A network-based server function that provides profile packages for installation in wireless devices is known as subscription manager data preparation (SM-DP, or SM-DP+). An SM-DP server may also be referred to as a profile provider, an eSIM server, an eSIM delivery server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to a UICC as the basis for loading and installing a profile. Profile data which is unique to a subscriber, e.g., a phone number or an International Mobile Subscriber Identity (IMSI), are examples of personalization data. The SM-DP communicates over an interface with a UICC. Certificates used for authentication and confidentiality purposes can be generated by a trusted certificate issuer.

UICC (SE) Description

Some aspects of an SE will be described here with respect to a UICC. A UICC includes an operating system, and the operating system can include ability to provide authentication algorithms to network access applications associated with a given operator. The operating system also can include the ability to translate profile package data into an installed profile using a specific internal format of the UICC. A security domain within the UICC contains mobile network operator (MNO) over the air (OTA) keys and provides a secure OTA channel. OTA keys are credentials used by an operator for remote management of operator profiles on a UICC.

Detailed Message Flow

FIG. 1 illustrates a diagram 100 of an exemplary detailed message flow for secure authentication, according to some embodiments. FIG. 1 illustrates a specific example applicable to establishing cellular wireless service for a new wireless device 150. In this case, the process begins at 111 with the existing device 110 interacting with a remote server 120 to perform a phone number registration. In some embodiments, the remote server 120 is an identity services (IDS) server maintained by a third party other than a mobile network operator (MNO) that can communicate with network-based servers of the MNO with which the cellular wireless service is to be established for the new wireless device 150. The remote server 120 can provide information that assists with authentication by the network-based servers to validate providing cellular wireless service to the new wireless device 150. At 132, the existing device 110 performs an extensible authentication protocol (EAP) authentication key agreement (AKA) procedure with an entitlement server 130 of an MNO to establish a secure communication link between the existing device 110 and the entitlement server 130. At 112, the existing device 110 initiates authentication with the entitlement server 130, which responds to the existing device 110 at 134 with a nonce generated at 133. At 113, the existing device 110 sends an authentication request (Get Authentication Token) to the remote server 120 to obtain a trust score from the remote server 120. The authentication request can be signed by the existing device 110 and can include one or more unique credentials associated with the existing device 110, such as an IMSI, a phone number, an IMEI, and/or an MEID, and the nonce previously received from the entitlement server 130.

At 121, the remote server 120 performs a security validation and calculates the trust score based at least in part on information provided by the existing device 110. In some embodiments, the existing device 110 provides an identity for an account maintained by the remote server 120 for a user of the existing device 110. The remote server 120 can use additional information maintained by the remote server 120 and/or accessible to the remote server 120 to generate the trust score. Examples of additional information include a history of associations of the phone number (of the existing device) or other credentials with the user and/or with the existing device 110. In some embodiments, the remote server 120 can query further servers (not shown) in order to obtain further information to generate the trust score. Based on the information, the remote server 120 generates the trust score.

At 122, the remote server 120 can reply to the existing device 110 with a signed message that includes the generated trust score. The signed message from the remote server 120 can also include the previously supplied credentials, e.g., the IMSI, the phone number, the IMEI, and/or the MEID, and the previously received nonce. The signed message from the remote server 120 can be signed by the entitlement server 130.

At 114, the existing device 110 can send a pre-flight request for security validation to the entitlement server 130. The pre-flight request can include the information provided by the remote server 120 including the trust score, credentials, and nonce as signed by the entitlement server. The pre-flight request can also include the nonce signed by the eUICC of the existing device 110. In response to the pre-flight request, the entitlement server 130 can perform a security validation procedure at 135 and, at 136, return a result based on the security validation procedure together with a carrier token, when the entitlement server 130 authenticates the user for establishing cellular wireless service for the new device 150. In some embodiments, the entitlement server 130 can use the trust score supplied by the remote server 120 as part of the security validation procedure to determine whether to allow the new device 150 to access cellular wireless services. In some embodiments, the new device 150 can be added to an existing wireless service account with which the existing device 110 is associated. In some embodiments, the new device 150 replaces another device (not shown) that is associated with the existing device 110.

At 115, the existing device 110 can send a message to the entitlement server 130 to sign up for cellular wireless service for the new device 150, e.g., by obtaining an eSIM to authorize the new device 150 to access the requested cellular wireless service. At 116, the existing device 110 can launch a web sheet and provide data to web sheet server 140 along with the token provided by the entitlement server 130. At 141, the web sheet server 140 can query the entitlement server 130, which uses a trust score for the existing device 110 to determine whether additional credentials, such as login credentials, are necessary to allow for establishing cellular wireless service for the new device 150, e.g., by provisioning of an eSIM to the new device 150. In some embodiments, the entitlement server 130, based on the trust score, at 137, indicates to the web sheet server 140 that login credentials are not required and provisioning of an eSIM to the new device 150 (or activation of a SIM/eSIM for the new device 150) can proceed. In some embodiments, the entitlement server 130, based on the trust score, indicates to the web sheet server 140 that login credentials are required (not shown) in order to proceed with provisioning. The response at 137 from the entitlement server 130 can indicate explicitly or implicitly whether a login process can be skipped. When the login process can be skipped, the web sheet server 140, at 142, can provide a response (such as a JavaScript (JS) call back) to the existing device 110 to cause the existing device 110 to trigger installation and/or activation of a SIM/eSIM for the new device 150. At 117, the existing device 110 can provide a communication conduit for installation and/or activation of a SIM/eSIM from a network-based subscription management server, e.g., SM-DP+ 160, to the new device 150.

Figure 2:
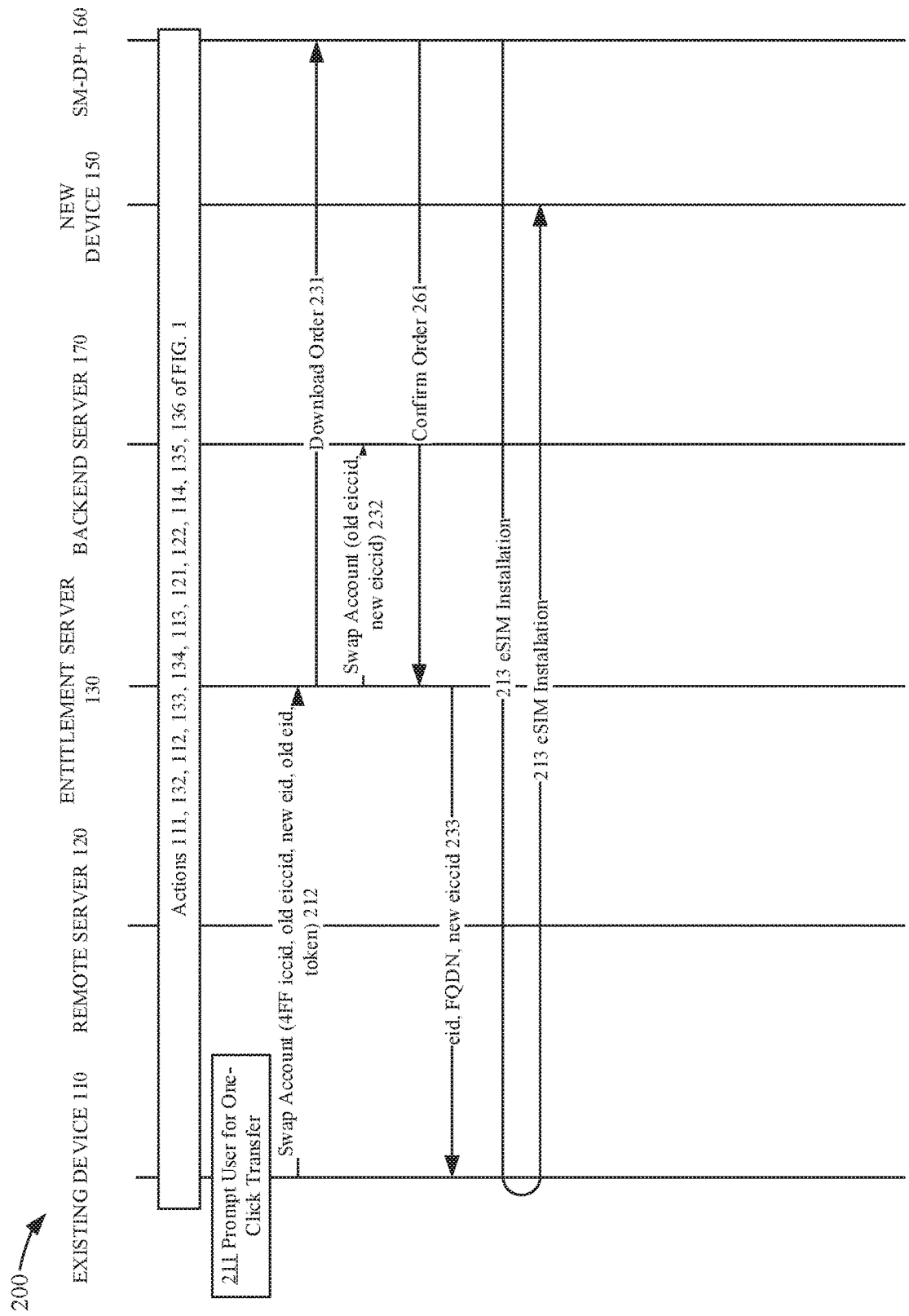
FIG. 2 illustrates another exemplary detailed message flow for secure password-less authentication, according to some embodiments.

FIG. 2 illustrates a diagram 200 of another exemplary detailed message flow for secure authentication, according to some embodiments. FIG. 2 illustrates an example of an account transfer from a previous device (not shown) to the new device 150, according to certain embodiments. The account transfer process illustrated in FIG. 2. resembles the account sign up process described with respect to FIG. 1, including the actions 111, 132, 112, 133, 134, 113, 121, 122, 114, 135, and 136, i.e., up to and including the existing device 110 receiving at 136, from the entitlement server, the result of the security validation performed at 135 by the entitlement server 130 and the carrier token. After receiving the carrier token and result of the security validation, the existing device 110, at 211, prompts the user to initiate an account transfer, e.g., a one-click transfer of a previously established user account from a previous device (not shown) to the new device 150.

Responsive to an indication from the user to perform the account transfer, the existing device 110, at 212, sends a swap account request to the entitlement server 130. The swap account request can include the carrier token obtained from the entitlement server as well as a set of unique identifiers for the previous device (not shown) and/or for the new device 150, e.g., one or more of: an old eICCID, a SIM (4FF) ICCID, an old EID, and/or a new EID. The entitlement server 130, at 231, can provide a download order message to the subscription management server, e.g., SM-DP+ 160, and receive a confirmation of the requested order at 261. At 232, the entitlement server 130 can also provide a swap account instruction to a backend server 170 to move a previously established user account from the previous (old) device to the new device 150. The swap account instruction can include unique identifiers, including an old eICCID, associated with an eSIM of the previous (old) device, and a new eICCID, associated with an eSIM for the new device 150. The entitlement server 130 can verify the carrier token obtained from the existing device 110 and can respond, at 233, with additional credentials and/or information, e.g., an EID, a fully qualified domain name (FQDN), and the new eICCID. After receiving the response from the entitlement server 130, the existing device 110, at 213 can provide a communication conduit for installation and/or activation of a SIM/eSIM from a network-based subscription management server, e.g., SM-DP+ 160, to the new device 150.

Figure 3:
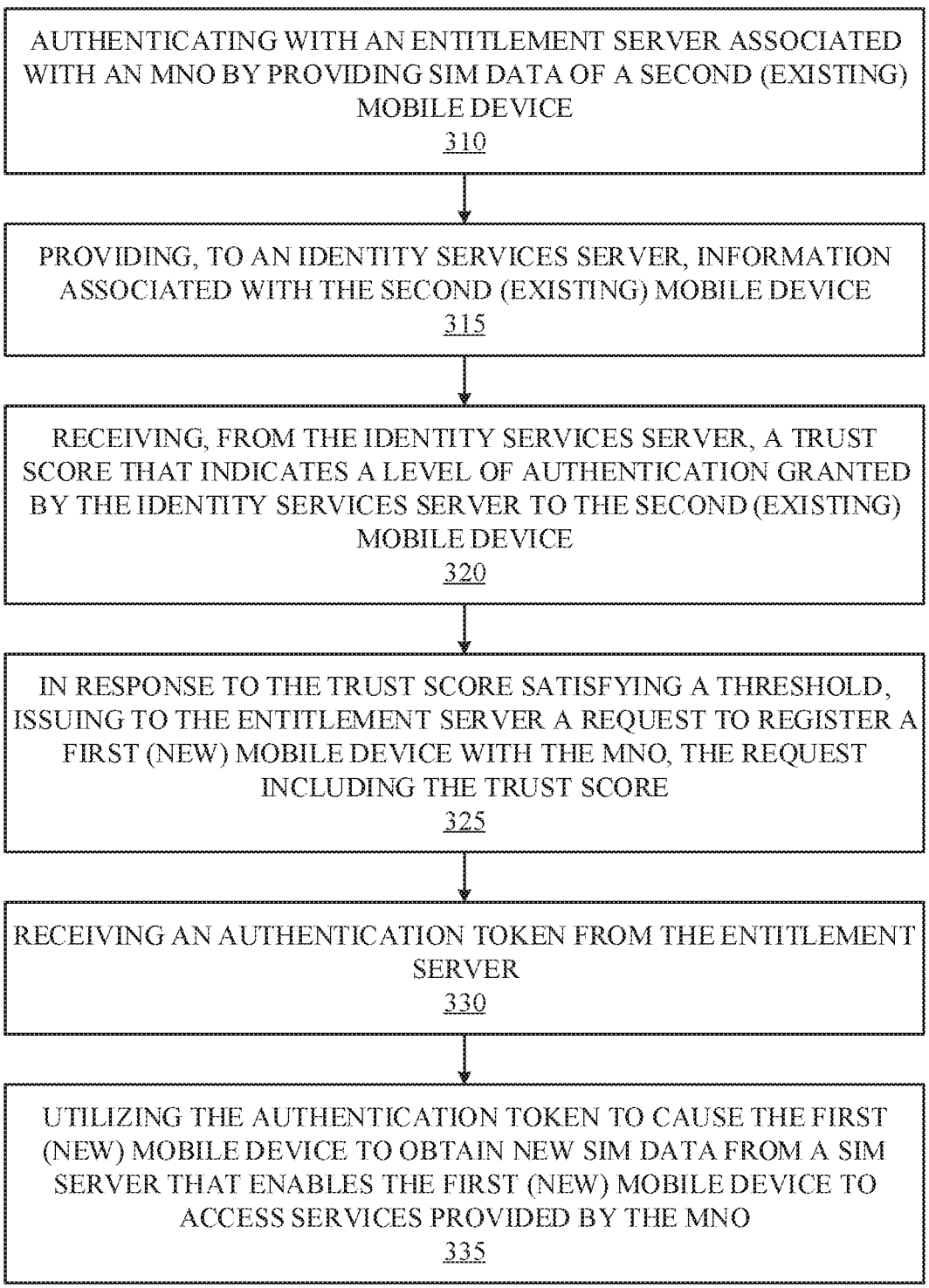
FIG. 3 illustrates a flow diagram of an exemplary method for enabling a first mobile device to gain access to wireless services provided by an MNO, according to some embodiments.

FIG. 3 illustrates a flow diagram 300 of an exemplary method for enabling a first mobile device, e.g., the new device 150, to gain access to wireless services provided by an MNO, where the first mobile device is associated with (or to be associated with) a second mobile device, e.g., the existing device 110, that has an already established wireless service account with the MNO. In some embodiments, the first mobile device (new device 150) is added to an existing wireless service account without requiring use of MNO login credentials, e.g., addition of a second phone, addition of a tablet, addition of a wearable device. In some embodiments, the wireless service account is transferred from a previous device (not shown) to the first mobile device, e.g., when replacing a phone, tablet, and/or wearable device. In some embodiments, the wireless service account is transferred from the second mobile device, e.g., the existing device 110, to the first mobile device, e.g., the new device 150.

At 310, the second mobile device, e.g., existing device 110, authenticates with an entitlement server 130 associated with the MNO, such as by providing SIM data that is possessed by the second mobile device and known to the entitlement server 130. At 315, the second mobile device, e.g., existing device 110, further provides to an identity services server, e.g., the remote server 120 or similar server that provides identity services, information associated with the second mobile device, e.g., credentials, identifiers, or the like. At 320, the second mobile device receives from the identity services server a trust score that indicates a level of authentication granted by the identity services server to the second mobile device. When the trust score satisfies a threshold, the second mobile device, at 325, issues to the entitlement server 130 a request to register the first mobile device with the MNO, where the request includes the trust score obtained from the identity services server. At 330, the second mobile device receives an authentication token from the entitlement server 130. At 335, the second mobile device uses the authentication token to cause the first mobile device, e.g., the new device 150, to obtain new SIM data from a SIM server, e.g., SM-DP+ 160, to access services provided by the MNO.

In some embodiments, the first mobile device is a supplemental mobile device, e.g., the new device 150, that can be used in conjunction with the second mobile device, and each of the SIM data for access to services of the MNO by the second mobile device and the new SIM data for access to services of the MNO by the first mobile device are associated with a same phone number or with a respective different phone number. In some embodiments, the new SIM data provides the first mobile device with access to a same of services as for the second mobile device. In some embodiments, the new SIM data provides the first mobile device with access to a different set of services than provided for the second mobile device. For example, the second (original) mobile device can access voice and data services, while the first (supplemental) mobile device can access only data services. In some embodiments, both the first mobile device and the second mobile device can each access respective services provided by the MNO using respective SIM data.

In some embodiments, the first mobile device, the new device 150, is a supplemental mobile device that replaces another supplemental mobile device (not shown) that is associated with the second mobile device, the existing device 110, and each of the SIM data for access to services of the MNO by the second mobile device and the new SIM data for access to services of the MNO by the first mobile device are associated with a same phone number or with a respective different phone number. In some embodiments, the new SIM data provides the first mobile device with access to a same of services as for the second mobile device. In some embodiments, the new SIM data provides the first mobile device with access to a different set of services than provided for the second mobile device. In some embodiments, when the first (new) mobile device replaces the second (previous) mobile device, a history associated with the second (previous) mobile device is maintained, e.g., by one or more network-based servers, for the first (new) mobile device and/or the history is transferred between storage mediums of the mobile devices. In some embodiments, the first (new) mobile device is associated with a same account as used for the second (previous0 mobile device, where the same account is maintained by a network-based server, e.g., a wireless carrier based server and/or a third-party server. In some embodiments, a history for the second (previous) mobile device transfers over to the first (new) mobile device, e.g., in which case a trust score for the second (previous) mobile device can continue for the first (new) mobile device.

In some embodiments, the first mobile device is a replacement mobile device for the second mobile device, and each of the SIM data provided to the entitlement server for authentication of the second mobile device, and the new SIM data used for access to services by the first mobile device, are associated with the same phone number. In some embodiments, activation and/or installation of the new SIM data for the phone number on the first mobile device renders the SIM data for the second mobile device obsolete to prevent the second mobile device from accessing services provided by the MNO.

In some embodiments, the trust score is based on one or more of: (i) a first duration of a relationship that exists between a user of the second (existing) mobile device and a phone number associated with the second (existing) mobile device, e.g., based on a third-party services account, such as an iCloud® account, being associated with the phone number, (ii) a second duration of an association between the second (existing) mobile device and the phone number of the second (existing) mobile device, (iii) a first verification that the second (existing) mobile device has not been modified outside of a configuration that is enforced by a managing entity, or (iv) a second verification that the user and/or the second (existing) mobile device are not associated with fraudulent activity.

In some embodiments, the information associated with the second (existing) mobile device includes a digital signature produced using a private key associated with the second (existing) mobile device. In some embodiments, the information includes a nonce that is received from the entitlement server 130 responsive to authenticating with the entitlement server 130, where the nonce is included in the request to register the first (new) mobile device with the MNO. In some embodiments, the information includes one or more of: (i) a phone number associated with the second (existing) mobile device, an IMEI associated with the second (existing) mobile device, or a MEID associated with the second (existing) mobile device. In some embodiments, the identity services server possesses a public key counterpart that enables the identity services server to verify the digital signature. In some embodiments, the request to register the first (new) mobile device with the MNO includes a second digital signature produced using a private key associated with the identity services server. In some embodiments, in conjunction with providing the trust score to the second (existing) mobile device, the identity services server provides, to the entitlement server, a public key that is counterpart to the private key associated with the identity services server to enable the second digital signature to be verified by the entitlement server.

Figure 4:
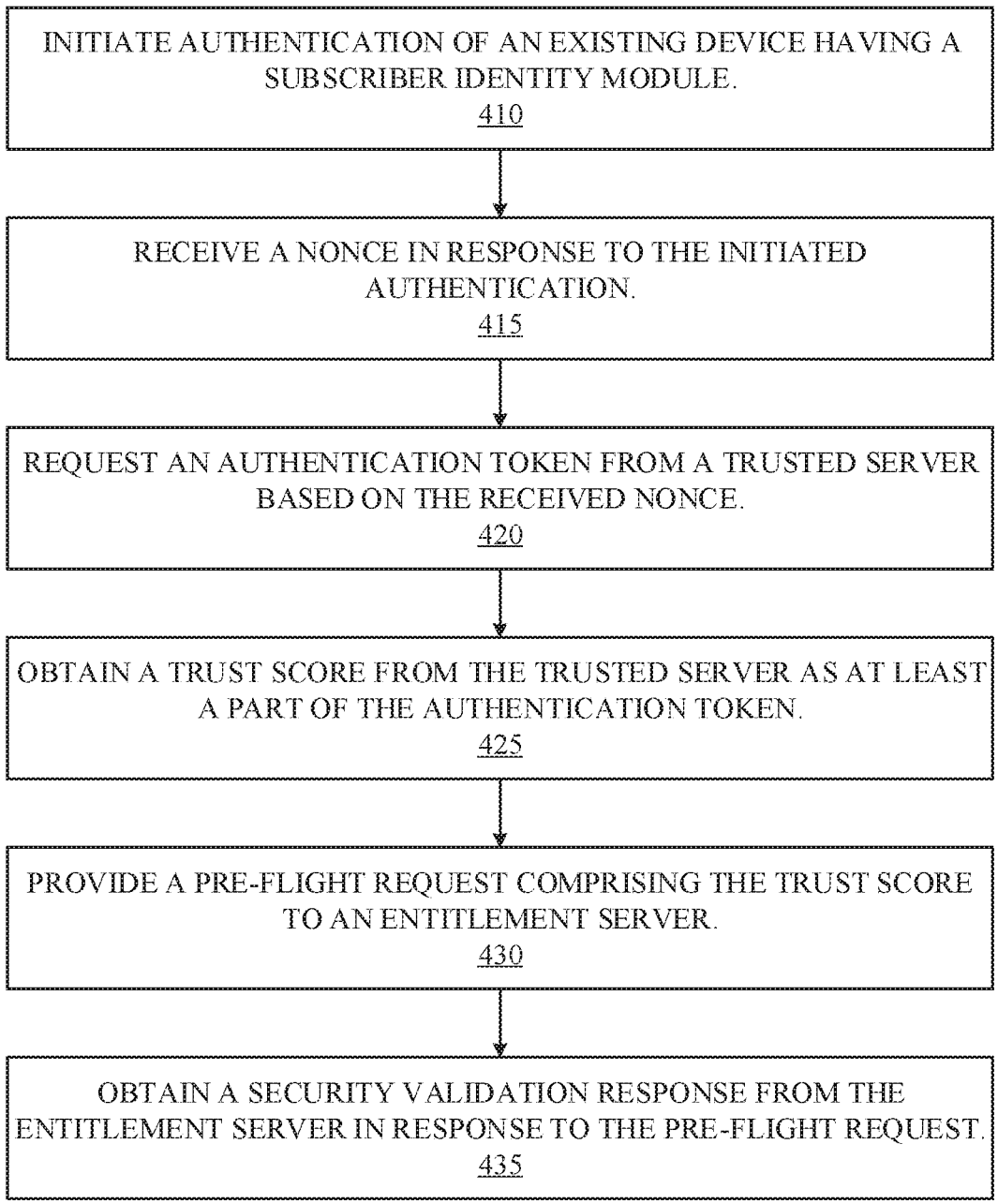
FIG. 4 illustrates a diagram of an exemplary method to obtain a security validation from an entitlement server based on a trust score, according to some embodiments.

FIG. 4 illustrates a diagram 400 of an exemplary method to obtain a security validation from an entitlement server 130 based on a trust score, according to certain embodiments. At 410, a device, e.g., existing device 110, initiates authentication with the entitlement server 130 using information from a SIM and/or eSIM of the existing device 110. At 415, the existing device 110 receives, from the entitlement server 130, a nonce in response to the authentication initiation. At 420, the existing device 110 requests an authentication token from a trusted server, e.g., remote server 120, which can be an identity services server or IDS server as described herein. The request for the authentication token can include information or credentials associated with the existing device 110, e.g., an IMSI, a phone number, an IMEI, and/or an MEID. The request for the authentication token can also include the nonce obtained from the entitlement server 130. At 425, the existing device 110 obtains a trust score from the trusted server, where the trust score can be included as part of the authentication token or within a message from the trusted server, the message including the authentication token. In some embodiments, a signed message from the trusted server includes the trust score, the nonce, and additional information or credentials previously provided: e.g., the IMSI, the phone number, the IMEI, and/or the MEID.

At 430, the existing device 110 provides, to the entitlement server 130, a pre-flight request that includes the trust score, where the pre-flight request is a signed message that includes the trust score, the nonce, and information and/or credentials, such as the IMSI, the phone number, the IMEI, and/or the MEID. This information and/or credentials can be the same information as provided to the trusted server, e.g., to remote server 120. The signed message can include the nonce as signed by the trusted server. The existing device 110 can also provide, to the entitlement server 130, the nonce as signed by a component of the existing device 110, such as by the eUICC of the existing device 110. At 435, the existing device 110 obtains a security validation response from the entitlement server 130 in response to the pre-flight request, where the security validation response includes a result of a security validation performed by the entitlement server 130 based at least in part on the trust score provided to the entitlement server 130. The security validation response to the pre-flight request can include a carrier token indicative of the result of the security validation.

Figure 5:
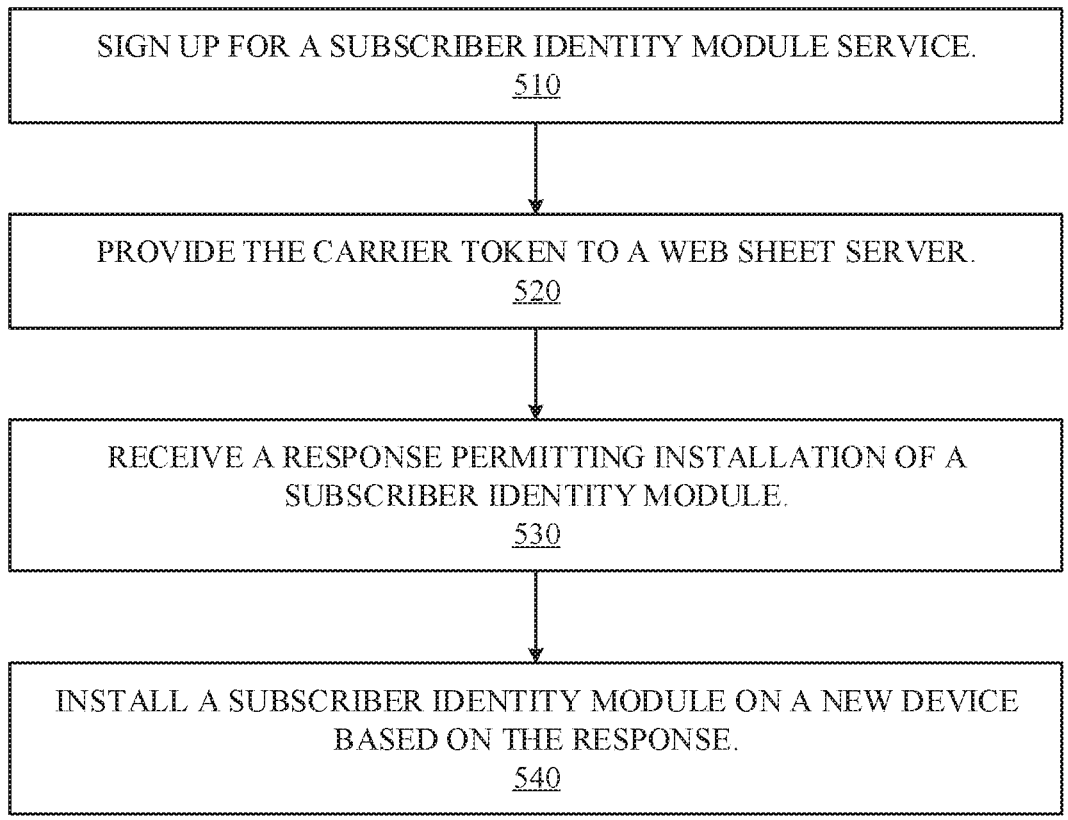
FIG. 5 illustrates a diagram of additional actions that can follow those illustrated in FIG. 4, according to some embodiments.

FIG. 5 illustrates a diagram 500 of additional actions that can follow those illustrated in FIG. 4. At 510, the existing device 110, indicates a request to establish access to wireless carrier services by communicating with the entitlement server 130. At 520, the existing device 110, provides the carrier token obtained from the entitlement server 130 to a web sheet server 140. The carrier token can be provided together with additional data, which can be referred to as post data. At 530, the existing device 110 receives a response from the web sheet server, the response permitting installation of a profile, e.g., a SIM or eSIM, to a new device 150. In some embodiments, the web sheet server 140 queries the entitlement server 130 to determine whether the existing device 110 can be trusted, e.g., based on the previously provided trust score, and as a result whether a login credential process for the MNO can be skipped. At 540, the existing device 110 provides a conduit for installation of a profile, e.g., a SIM or eSIM, from a subscription management server, e.g., SM-DP+ 160, to the new device 150. In some embodiments, the existing device 110 is a cellular smart phone, and the new device 150 is a wearable device associated with the cellular smart phone.

Figure 6:
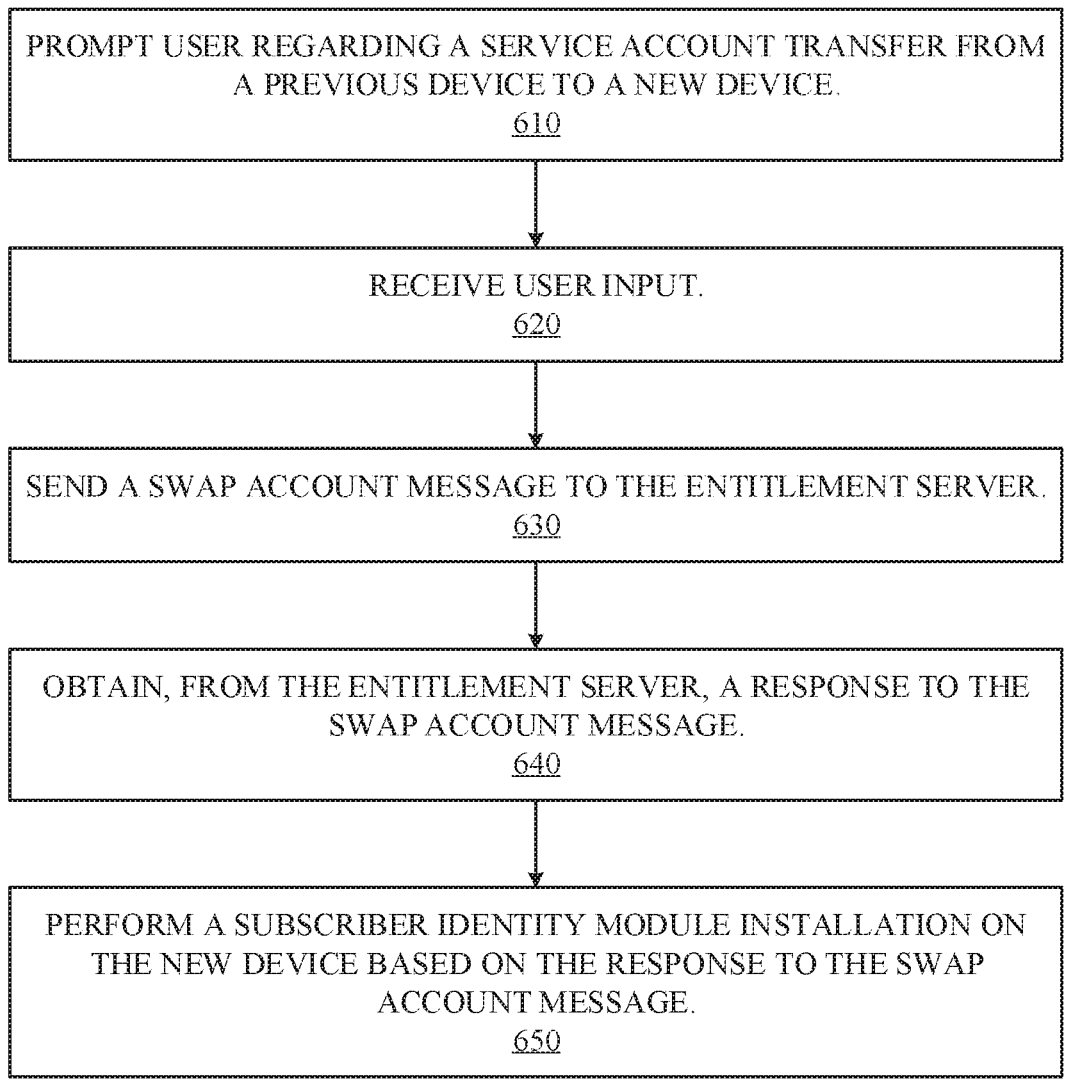
FIG. 6 illustrates a diagram of additional actions that can follow those illustrated in FIG. 4, according to some embodiments.

FIG. 6 illustrates a diagram 600 of additional actions that can follow those illustrated in FIG. 4. At 610, the existing device 110 prompts a user of the existing device 110 regarding transfer of a service account from a previous device, e.g., from the existing device 110 or from another device (not shown), to the new device 150. At 620, the existing device 110 receives user input to indicate initiation of the service account transfer, where the user input may be a single click, such as pressing a button displayed on a user interface of the existing device 110. Other user input mechanisms are also permitted.

Responsive to receipt of the user input, at 630, the existing device 110 sends a swap account message to the entitlement server 130. The swap account message can include the carrier token obtained previously from the entitlement server 130 and additional information and/or credentials, such as an ICCID associated with a SIM card, an eICCID associated with an eSIM, and one or more equipment identifiers (EIDs). At 640, the existing device 110 obtains, from the entitlement server 130, a response to the swap account message, the response including additional information and/or credentials for installation, provisioning, and/or activation of a profile, e.g., SIM or eSIM, for the new device 150. Examples of the information or credentials can include an EID, a fully qualified domain name (FQDN), and/or a new eICCID. At 650, the existing device 110 provides a conduit for installation of a profile, e.g., a SIM or eSIM, from a subscription management server, e.g., SM-DP+ 160, to the new device 150.

Representative Exemplary Apparatus

Figure 7:
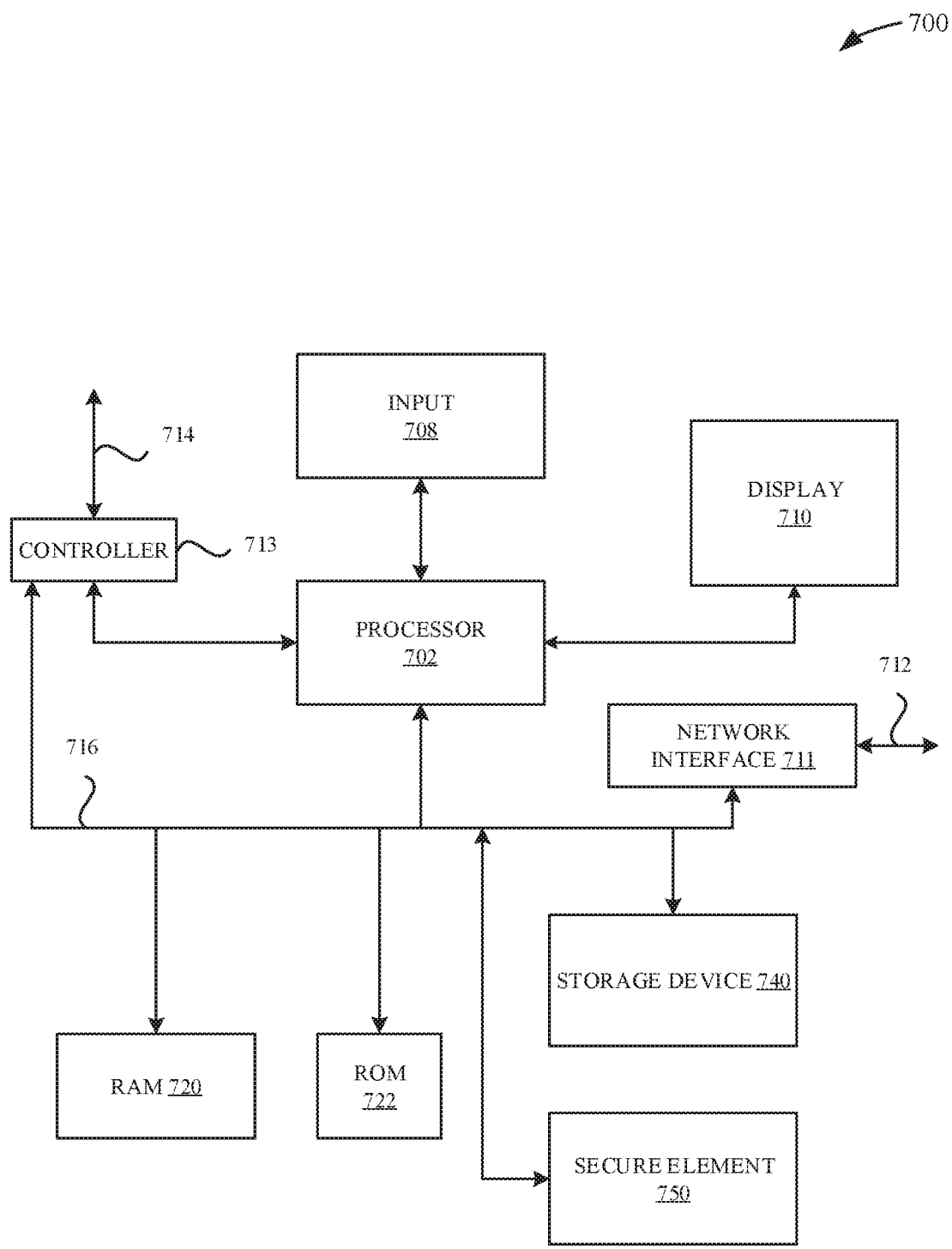
FIG. 7 illustrates in block diagram format an exemplary computing device that can be used to implement the various components and techniques described herein, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the existing device 110 and/or secondary new device 150. As shown in FIG. 7, the computing device 700 can include a processor 702 that represents a microprocessor or controller for controlling the overall operation of computing device 700. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. The user input may, for example, involve responding to a prompt at the user interface, as described for FIG. 2 at 211. In some embodiments, the computing device 700 can include a display 710 (screen display) that can be controlled by the processor 702 to display information to the user (for example, information relating to incoming, outgoing, or active communication session). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor. The computing device 700 can also include a secure element 750. The secure element 750 can include an eUICC and/or UICC.

The computing device 700 also includes a storage device 740, which can include a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Representative Embodiments

In some embodiments, a method for enabling a first (new) mobile device to access services provided by a Mobile Network Operator (MNO) includes a second (previous) mobile device that is associated with the first (new) mobile device to perform the following: (i) authenticating with an entitlement server associated with the MNO by providing subscriber identity module (SIM) data that is possessed by the second mobile device and known to the entitlement server; (ii) providing, to an identity services server associated with a managing entity of the second mobile device, information associated with the second mobile device; (iii) receiving, from the identity services server, a trust score that indicates a level of authentication granted by the identity services server to the second mobile device; and (iv) in response to determining that the trust score satisfies a threshold: issuing, to the entitlement server, a request to register the first mobile device with the MNO, where the request includes the trust score, receiving an authentication token from the entitlement server, and utilizing the authentication token to cause the first mobile device to obtain new SIM data from a SIM server that enables the first mobile device to access services provided by the MNO.

In some embodiments, the first mobile device is a replacement mobile device for the second mobile device, each of the SIM data and the new SIM data is associated with a same phone number, and as a result of the first mobile device obtaining the new SIM data, the method further includes rendering the SIM data of the second mobile device obsolete to prevent the second mobile device from accessing services provided by the MNO. In some embodiments, the first mobile device is a supplemental mobile device to the second mobile device, each of the SIM data and the new SIM data is associated with a same or a respective different phone number and/or with a same or a respective different set of services, and each of the first mobile device and the second mobile device remains capable of accessing services provided by the MNO. In some embodiments, the trust score is based on one or more of: (a) a first duration of a relationship that exists between a user of the second mobile device and a phone number associated with the second mobile device, (b) a second duration of an association between the second mobile device and the phone number associated with the second mobile device, (c) a first verification that the second mobile device has not been modified outside of a configuration that is enforced by the managing entity, or (d) a second verification that one or more of the user or the second mobile device are not associated with fraudulent activity. In some embodiments, the trust score of the second (previous) mobile device and/or a history of associations, relationships, and/or activity of the second mobile device is maintained and migrates over to the first (new) mobile device, e.g., based on continuation of an associated with a common user account maintained by a network-based server of the MNO and/or of a third party. As such, a trust score that exceeds a threshold for adding a new device and/or transferring between devices can be maintained for a newly added (or transferred) device.

In some embodiments, the information associated with the second mobile device includes a digital signature produced using a private key associated with the second mobile device, and the information includes: (1) a nonce that is received from the entitlement server in response to authenticating with the entitlement server, where the nonce is included in the request to register the first mobile device with the MNO, and (2) one or more of: (i) a phone number associated with the second mobile device, (ii) an International Mobile Equipment (IMEI) associated with the second mobile device, or a Mobile Equipment Identifier (MEID) associated with the second mobile device. In some embodiments, the identity services server is in possession of a public key that is counterpart to the private key associated with the second mobile device and enables the identity services server to verify the digital signature. In some embodiments, the request to register the first mobile device with the MNO includes a second digital signature produced using a second private key associated with the identity services server. In some embodiments, the entitlement server is in possession of a second public key corresponding to the second private key associated with the identity services server, and the second public key enables the entitlement server to verify the second digital signature. In some embodiments, the SIM data is associated with (1) a physical SIM card installed on the second mobile device, or (2) an electronic SIM (eSIM) that is installed on the second mobile device, where the eSIM serves as a virtualization of a physical SIM card.

In some embodiments, a second (previous) mobile device is configured to enable a first (new) mobile device to access services provided by a Mobile Network Operator (MNO), where the second mobile device includes: at least one processor; and at least one memory storing instructions that, when executed by the at least one processor, cause the second mobile device to: (i) authenticate with an entitlement server associated with the MNO by providing subscriber identity module (SIM) data that is possessed by the second mobile device and known to the entitlement server; (ii) provide, to an identity services server associated with a managing entity of the second mobile device, information associated with the second mobile device; (iii) receive, from the identity services server, a trust score that indicates a level of authentication granted by the identity services server to the second mobile device; and (iv) in response to determining that the trust score satisfies a threshold: (a) issue, to the entitlement server, a request to register the first mobile device with the MNO, where the request includes the trust score, (b) receive an authentication token from the entitlement server, and (c) utilize the authentication token to cause the first mobile device to obtain new SIM data from a SIM server that enables the first mobile device to access services provided by the MNO.

In some embodiments, the first mobile device is a replacement mobile device for the second mobile device, each of the SIM data and the new SIM data is associated with a same phone number, thereby as a result of the first mobile device obtaining the new SIM data, the SIM data of the second mobile device is rendered obsolete to prevent the second mobile device from accessing services provided by the MNO. In some embodiments, the first mobile device is a supplemental mobile device to the second mobile device, each of the SIM data and the new SIM data is associated with a same or a respective different phone number and/or with a same or a respective different set of services, and each of the first mobile device the second mobile device remains capable of accessing services provided by the MNO. In some embodiments, the trust score is based on one or more of: (a) a first duration of a relationship that exists between a user of the second mobile device and a phone number associated with the second mobile device, (b) a second duration of an association between the second mobile device and the phone number associated with the second mobile device, (c) a first verification that the second mobile device has not been modified outside of a configuration that is enforced by the managing entity, or (d) a second verification that one or more of the user or the second mobile device are not associated with fraudulent activity. In some embodiments, the information associated with the second mobile device includes a digital signature produced using a private key associated with the second mobile device, and the information includes: (1) a nonce that is received from the entitlement server in response to authenticating with the entitlement server, where the nonce is included in the request to register the first mobile device with the MNO, and (2) one or more of: (i) a phone number associated with the second mobile device, (ii) an International Mobile Equipment (IMEI) associated with the second mobile device, or (iii) a Mobile Equipment Identifier (MEID) associated with the second mobile device.

In some embodiments, an apparatus is configurable for operation in a second (previous) mobile device to enable a first (new) mobile device to access services provided by a Mobile Network Operator (MNO), where the apparatus is configured to: (i) authenticate with an entitlement server associated with the MNO by providing subscriber identity module (SIM) data that is possessed by the second mobile device and known to the entitlement server; (ii) provide, to an identity services server associated with a managing entity of the second mobile device, information associated with the second mobile device; (iii) receive, from the identity services server, a trust score that indicates a level of authentication granted by the identity services server to the second mobile device; and (iv) in response to determining that the trust score satisfies a threshold: (a) issue, to the entitlement server, a request to register the first mobile device with the MNO, where the request includes the trust score, (b) receive an authentication token from the entitlement server, and (c) utilize the authentication token to cause the first mobile device to obtain new SIM data from a SIM server that enables the first mobile device to access services provided by the MNO.

In some embodiments, the first mobile device is a replacement mobile device for the second mobile device, each of the SIM data and the new SIM data is associated with a same phone number, and as a result of the first mobile device obtaining the new SIM data, the SIM data of the second mobile device is rendered obsolete to prevent the second mobile device from accessing services provided by the MNO. In some embodiments, the first mobile device is a supplemental mobile device to the second mobile device, each of the SIM data and the new SIM data is associated with a same or a respective different phone number, and each of the first mobile device the second mobile device remains capable of accessing services provided by the MNO. In some embodiments, the trust score is based on one or more of: (a) a first duration of a relationship that exists between a user of the second mobile device and a phone number associated with the second mobile device, (b) a second duration of an association between the second mobile device and the phone number associated with the second mobile device, (c) a first verification that the second mobile device has not been modified outside of a configuration that is enforced by the managing entity, or (d) a second verification that one or more of the user or the second mobile device are not associated with fraudulent activity. In some embodiments, the information associated with the second mobile device includes a digital signature produced using a private key associated with the second mobile device, and the information includes: (1) a nonce that is received from the entitlement server in response to authenticating with the entitlement server, where the nonce is included in the request to register the first mobile device with the MNO, and (2) one or more of: (i) a phone number associated with the second mobile device, (ii) an International Mobile Equipment (IMEI) associated with the second mobile device, or (iii) a Mobile Equipment Identifier (MEID) associated with the second mobile device. In some embodiments, (a) the identity services server is in possession of a public key that is counterpart to the private key associated with the second mobile device and enables the identity services server to verify the digital signature, (b) the request to register the first mobile device with the MNO includes a second digital signature produced using a second private key associated with the identity services server, and (c) the entitlement server is in possession of a second public key that corresponds to the second private key associated with the identity services server, the second public key enabling the second digital signature to be verified by the entitlement server.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape, hard storage drives, solid state drives, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a first mobile device to access services provided by a Mobile Network Operator (MNO), the method comprising, at a second mobile device associated with the first mobile device:
   authenticating with an entitlement server associated with the MNO by providing subscriber identity module (SIM) data that is possessed by the second mobile device and known to the entitlement server;
   providing, to an identity services server associated with a managing entity of the second mobile device, information associated with the second mobile device;
   receiving, from the identity services server, a trust score that indicates a level of authentication granted by the identity services server to the second mobile device; and
   in response to determining that the trust score satisfies a threshold:
      issuing, to the entitlement server, a request to register the first mobile device with the MNO, wherein the request includes the trust score,
      receiving an authentication token from the entitlement server, and
      utilizing the authentication token to cause the first mobile device to obtain new SIM data from a SIM server that enables the first mobile device to access services provided by the MNO.

2. The method of claim 1, wherein:
   the first mobile device is a replacement mobile device for the second mobile device,
   each of the SIM data and the new SIM data is associated with a same phone number, and
   the method further comprises rendering the SIM data of the second mobile device obsolete to prevent the second mobile device from accessing services provided by the MNO.

3. The method of claim 1, wherein:
   the first mobile device is a supplemental mobile device to the second mobile device,
   each of the SIM data and the new SIM data is associated with a same or a respective different phone number and/or with a same or a respective different set of services, and
   each of the first mobile device and the second mobile device remains capable of accessing services provided by the MNO.

4. The method of claim 1, wherein the trust score is based on one or more of:
   a first duration of a relationship that exists between a user of the second mobile device and a phone number associated with the second mobile device,
   a second duration of an association between the second mobile device and the phone number associated with the second mobile device,
   a first verification that the second mobile device has not been modified outside of a configuration that is enforced by the managing entity, or
   a second verification that one or more of the user or the second mobile device are not associated with fraudulent activity.

5. The method of claim 1, wherein the information associated with the second mobile device includes a digital signature produced using a private key associated with the second mobile device, and the information comprises:
   (1) a nonce that is received from the entitlement server in response to authenticating with the entitlement server, wherein the nonce is included in the request to register the first mobile device with the MNO, and
   (2) one or more of:
      a phone number associated with the second mobile device,
      an International Mobile Equipment (IMEI) associated with the second mobile device, or
      a Mobile Equipment Identifier (MEID) associated with the second mobile device.

6. The method of claim 5, wherein the identity services server is in possession of a public key that is counterpart to the private key associated with the second mobile device and enables the identity services server to verify the digital signature.

7. The method of claim 6, wherein the request to register the first mobile device with the MNO includes a second digital signature produced using a second private key associated with the identity services server.

8. The method of claim 7, wherein:
   the entitlement server is in possession of a second public key corresponding to the second private key associated with the identity services server, and
   the second public key enables the entitlement server to verify the second digital signature.

9. The method of claim 1, wherein the SIM data is associated with (1) a physical SIM card installed on the second mobile device, or (2) an electronic SIM (eSIM) that is installed on the second mobile device, wherein the eSIM serves as a virtualization of a physical SIM card.

10. A second mobile device configured to enable a first mobile device to access services provided by a Mobile Network Operator (MNO), the second mobile device comprising:
    at least one processor; and
    at least one memory storing instructions that, when executed by the at least one processor, cause the second mobile device to:
       authenticate with an entitlement server associated with the MNO by providing subscriber identity module (SIM) data that is possessed by the second mobile device and known to the entitlement server;
       provide, to an identity services server associated with a managing entity of the second mobile device, information associated with the second mobile device;
       receive, from the identity services server, a trust score that indicates a level of authentication granted by the identity services server to the second mobile device; and
       in response to determining that the trust score satisfies a threshold:
          issue, to the entitlement server, a request to register the first mobile device with the MNO, wherein the request includes the trust score,
          receive an authentication token from the entitlement server, and
          utilize the authentication token to cause the first mobile device to obtain new SIM data from a SIM server that enables the first mobile device to access services provided by the MNO.

11. The second mobile device of claim 10, wherein:
    the first mobile device is a replacement mobile device for the second mobile device,
    each of the SIM data and the new SIM data is associated with a same phone number, and
    the SIM data of the second mobile device is rendered obsolete to prevent the second mobile device from accessing services provided by the MNO.

12. The second mobile device of claim 10, wherein:
the first mobile device is a supplemental mobile device to the second mobile device,
each of the SIM data and the new SIM data is associated with a same or a respective different phone number and/or with a same or a respective different set of services, and
each of the first mobile device the second mobile device remains capable of accessing services provided by the MNO.

13. The second mobile device of claim 10, wherein the trust score is based on one or more of:
a first duration of a relationship that exists between a user of the second mobile device and a phone number associated with the second mobile device,
a second duration of an association between the second mobile device and the phone number associated with the second mobile device,
a first verification that the second mobile device has not been modified outside of a configuration that is enforced by the managing entity, or
a second verification that one or more of the user or the second mobile device are not associated with fraudulent activity.

14. The second mobile device of claim 10, wherein the information associated with the second mobile device includes a digital signature produced using a private key associated with the second mobile device, and the information comprises:
(1) a nonce that is received from the entitlement server in response to authenticating with the entitlement server, wherein the nonce is included in the request to register the first mobile device with the MNO, and
(2) one or more of:
a phone number associated with the second mobile device,
an International Mobile Equipment (IMEI) associated with the second mobile device, or
a Mobile Equipment Identifier (MEID) associated with the second mobile device.

15. An apparatus configurable for operation in a second mobile device to enable a first mobile device to access services provided by a Mobile Network Operator (MNO), the apparatus configured to:
authenticate with an entitlement server associated with the MNO by providing subscriber identity module (SIM) data that is possessed by the second mobile device and known to the entitlement server;
provide, to an identity services server associated with a managing entity of the second mobile device, information associated with the second mobile device;
receive, from the identity services server, a trust score that indicates a level of authentication granted by the identity services server to the second mobile device; and
in response to determining that the trust score satisfies a threshold:
issue, to the entitlement server, a request to register the first mobile device with the MNO, wherein the request includes the trust score,
receive an authentication token from the entitlement server, and
utilize the authentication token to cause the first mobile device to obtain new SIM data from a SIM server that enables the first mobile device to access services provided by the MNO.

16. The apparatus of claim 15, wherein:
the first mobile device is a replacement mobile device for the second mobile device,
each of the SIM data and the new SIM data is associated with a same phone number, and
as a result of the first mobile device obtaining the new SIM data, the SIM data of the second mobile device is rendered obsolete to prevent the second mobile device from accessing services provided by the MNO.

17. The apparatus of claim 15, wherein:
the first mobile device is a supplemental mobile device to the second mobile device,
each of the SIM data and the new SIM data is associated with a same or a respective different phone number, and
each of the first mobile device the second mobile device remains capable of accessing services provided by the MNO.

18. The apparatus of claim 15, wherein the trust score is based on one or more of:
a first duration of a relationship that exists between a user of the second mobile device and a phone number associated with the second mobile device,
a second duration of an association between the second mobile device and the phone number associated with the second mobile device,
a first verification that the second mobile device has not been modified outside of a configuration that is enforced by the managing entity, or
a second verification that one or more of the user or the second mobile device are not associated with fraudulent activity.

19. The apparatus of claim 15, wherein the information associated with the second mobile device includes a digital signature produced using a private key associated with the second mobile device, and the information comprises:
(1) a nonce that is received from the entitlement server in response to authenticating with the entitlement server, wherein the nonce is included in the request to register the first mobile device with the MNO, and
(2) one or more of:
a phone number associated with the second mobile device,
an International Mobile Equipment (IMEI) associated with the second mobile device, or
a Mobile Equipment Identifier (MEID) associated with the second mobile device.

20. The apparatus of claim 19, wherein:
the identity services server is in possession of a public key that is counterpart to the private key associated with the second mobile device and enables the identity services server to verify the digital signature,
the request to register the first mobile device with the MNO includes a second digital signature produced using a second private key associated with the identity services server, and
the entitlement server is in possession of a second public key that corresponds to the second private key associated with the identity services server, the second public key enabling the second digital signature to be verified by the entitlement server.

* * * * *

UNITED STATES PATENT AND TRADEMARK OFFICE
CERTIFICATE OF CORRECTION

PATENT NO. : 10,917,790 B2
APPLICATION NO. : 15/996324
DATED : February 9, 2021
INVENTOR(S) : Li et al.

Page 1 of 1

It is certified that error appears in the above-identified patent and that said Letters Patent is hereby corrected as shown below:

In the Specification

At Column 5, Line 43: "with the existing mobile device, an IMEI/MED associated" should read -- with the existing mobile device, an IMEI/MEID associated --.

Signed and Sealed this
Seventh Day of December, 2021

Drew Hirshfeld
*Performing the Functions and Duties of the
Under Secretary of Commerce for Intellectual Property and
Director of the United States Patent and Trademark Office*